L. R. Faught. Lathe.

4390

Reissued May 23 1871

Witnesses.

J. Snowden Bell,

William E. Morgan

L. R. Faught by his Atty

Wm. W. Baldwin

United States Patent Office.

LUTHER R. FAUGHT, OF PHILADELPHIA, PENNSYLVANIA.

Letters Patent No. 60,163, dated December 4, 1866; reissue No. 4,390, dated May 23, 1871.

IMPROVEMENT IN TURNING-LATHES.

The Schedule referred to in these Letters Patent and making part of the same.

*To all whom it may concern:*

Be it known that I, LUTHER R. FAUGHT, of the city and county of Philadelphia, in the State of Pennsylvania, have invented a new and useful Improvement in Lathes, of which the following is a specification.

The object of my invention is to tighten lathe-spindles in their sockets to prevent the spindle from being forced out of its central position and to compensate wear of the parts; to which ends, My improvement consists in a novel method of combining a lathe-stock, a lathe-spindle, a clamping-sleeve surrounding the spindle, and an adjusting-nut surrounding the sleeve, as hereinafter more fully described.

In the accompanying drawing—

Figure 1:
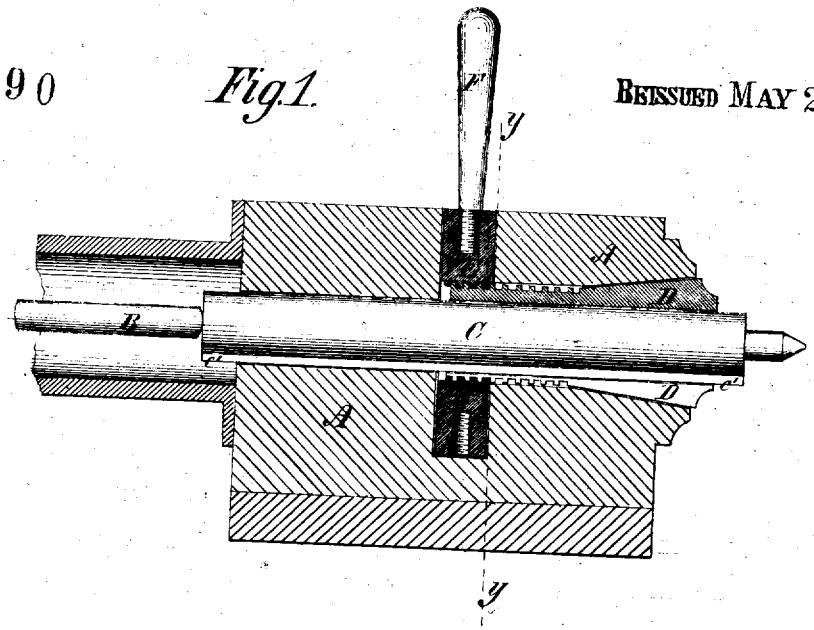
Figure 2:
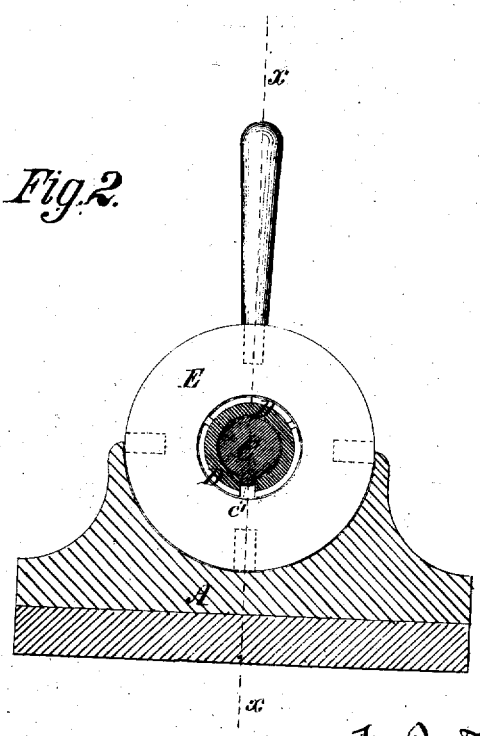

Figure 1 is a vertical longitudinal central section, through a lathe-stock embracing my improvement, at the line *x x* of fig. 2, and Figure 2 a transverse section through the same at the line *y y* of fig. 1.

As constructed prior to the date of my invention, the stationary or tail-spindles of lathes have been clamped in their stocks by set-screws or equivalent devices, the tendency of which was to force the tail-spindle out of line with the live spindle, and correspondingly to impair the accurate working of the lathe.

These lathes, moreover, had no means of compensating wear of the spindle and stock, except by reboring and bushing, which process entails considerable expense and delay.

My improvement obviates both these objections, the clamping action of the sleeve being exerted equally around the periphery of the spindle and toward its axis, and the wear is hence equal at all points, and can be taken up whenever necessary by varying the position of the handle which operates the nut.

The spindle C is mounted in a stock, A, and moved longitudinally therein, when required, by a screw on the rod B, in the usual manner.

A split sleeve, D, which is turned to a conical form at its outer end and has a strong screw-thread cut upon its inner end, is bored out to fit accurately upon the spindle C, which it embraces within the stock A, which is bored out to receive the cone-shaped portion of the sleeve D.

A cylindrical nut, E, fitting neatly in a recess formed in the stock A, engages the screw upon the cylindrical portion of the sleeve D, and, according to the direction in which it is turned by a handle, F, which can be screwed into one of a series of holes in its periphery, draws the sleeve D into or protrudes it from the stock, and correspondingly clamps or releases the spindle C, as the case may be.

When drawn into the stock by the partial rotation of the nut the split sleeve D closes upon the spindle C, upon which is formed a feather, *c*, which rests in a slot formed in the sleeve, and the spindle, sleeve, nut, and socket are clamped firmly together.

A reverse movement of the nut pushes the sleeve outward, thereby relaxing its tension upon the spindle, and allowing the latter to be moved longitudinally in the stock, as required.

Wear of the parts is compensated for, whenever required, by inserting the handle F in a different hole in the nut, which enables the sleeve to be drawn further into its recess in the stock.

What I claim as my invention, and desire to secure by Letters Patent, is—

The combination, with the spindle, of the stock, the split screwed clamping-sleeve embracing the spindle, and the nut embracing the sleeve, these parts being constructed and arranged to operate, in combination substantially as hereinbefore set forth, to keep the spindle in its true axial position, and to compensate for the wear of the spindle and sleeve, as described.

L. R. FAUGHT.

Witnesses:
GEO. H. KIRK,
JOHN H. REDFIELD.